US012340679B2

(12) United States Patent
Lopes De Lima et al.

(10) Patent No.: US 12,340,679 B2
(45) Date of Patent: Jun. 24, 2025

(54) ALARM MANAGEMENT METHODS AND SYSTEMS

(71) Applicants: PETRÓLEO BRASILEIRO S.A.—PETROBRAS, Rio de Janeiro (BR); PONTIFÍCIA UNIVERSIDADE CATÓLICA DO RIO DE JANEIRO, Rio de Janeiro (BR)

(72) Inventors: Marcelo Lopes De Lima, Rio de Janeiro (BR); William Paulo Ducca Fernandes, Rio de Janeiro (BR); Rafael Augusto Gaseta França, Rio de Janeiro (BR); Georges Miranda Spyrides, Rio de Janeiro (BR); Sonia Fiol Gonzalez, Havana (CU); Hélio Côrtes Vieira Lopes, Rio de Janeiro (BR)

(73) Assignees: PETRÓLEO BRASILEIRO S.A.—PETROBRAS, Rio de Janeiro (BR); PONTIFÍCIA UNIVERSIDADE CATÓLICA DO RIO DE JANEIRO, Rio de Janeiro (BR)

( * ) Notice: Subject to any disclaimer, the term of this patent is extended or adjusted under 35 U.S.C. 154(b) by 22 days.

(21) Appl. No.: 18/397,129

(22) Filed: Dec. 27, 2023

(65) Prior Publication Data

US 2024/0221493 A1 Jul. 4, 2024

(30) Foreign Application Priority Data

Dec. 28, 2022 (BR) .......................... 1020220268738

(51) Int. Cl.
*G08B 31/00* (2006.01)
*G08B 27/00* (2006.01)

(52) U.S. Cl.
CPC ............ *G08B 31/00* (2013.01); *G08B 27/00* (2013.01)

(58) Field of Classification Search
CPC .... G08B 27/00; G08B 25/14; G05B 23/0272; G05B 23/027
See application file for complete search history.

(56) References Cited

U.S. PATENT DOCUMENTS

| | | | |
|---|---|---|---|
| 11,908,304 B1* | 2/2024 | Mecocci | G08B 25/001 |
| 2010/0211192 A1* | 8/2010 | Stluka | G05B 23/0272 |
| | | | 700/12 |
| 2016/0019777 A1* | 1/2016 | Peterson | G08B 17/10 |
| | | | 340/506 |
| 2019/0187672 A1* | 6/2019 | Hollender | G05B 19/0428 |
| 2022/0207988 A1* | 6/2022 | Ghosh | G08B 29/186 |

* cited by examiner

*Primary Examiner* — Mirza F Alam
(74) *Attorney, Agent, or Firm* — Womble Bond Dickinson (US) LLP (57) ABSTRACT

The present disclosure relates to embodiments of alarm management methods and systems, which allow mapping the actual process of responding to alarms in a specific technical area. The mapping contributes to better effectiveness of alarm systems, thereby avoiding stops or even process accidents. An embodiment of a method includes obtaining an original record, performing a pre-processing application on the original record, grouping of cases, performing application of descriptive statistics, performing application of present percentage and expansion of occurrences, constructing an activity table with mining application, and providing technical data.

20 Claims, 13 Drawing Sheets

Alarm analysis LIC4I00070

13 occurrences in September 2020

» Operator actions

Expansion of occurrence ⓘ      Attendance percentage ⓘ

1x —●——— 164x     2      15.35% ——●———— 100%    30.769

☐ Select all      [Accept actions in green]

| | | Operator action | | Expansion of occurrence | | Attendance percentage ↓ |
|---|---|---|---|---|---|---|
| ☑ | 🔒 | LIC4I00070JACK | | 163.49 | | 100.00% |
| ☐ | 🔒 | FF1C4I00037\|InteractionPar.FacePlate.SpTargetValue | | 2.43 | | 30.77% |
| ☐ | 🔒 | B4I0003A\|PowerOff | | 1.32 | | 30.77% |
| ☐ | 🔒 | MV4I00012\|InteractionPar.ManCmdt | | 1.05 | | 30.77% |
| ☐ | 🔒 | MV4I00052\|BPlock1 | | 1.97 | | 23.06% |
| ☑ | 🔒 | TIC4I0015A\|InteractionPar.FacePlate_OutManValue | | 1.30 | | 23.06% |
| ☑ | 🔒 | MV4I00104C\|BPlock1 | | 1.30 | | 23.06% |
| ☐ | 🔒 | FIC4I00144\|PIDMode | | 1.30 | | 23.06% |
| ☐ | 🔒 | TIC4I00032A\|PIDMode | | 1.30 | | 23.06% |
| ☐ | 🔒 | TIC4I00031A\|InteractionPar.FacePlate_OutManValue | | 1.30 | | 23.06% |

Alarm analysis PI4100205A
29 occurrences in September 2020

» Operator actions                                                                                    ⓘ

Expansion of occurrence ⓘ                    Attendance percentage ⓘ
●━━━━━━━━━━━━━━━━━1                         ●━━━━━━━━━━━━━━━━━7.1426
1x                                39x         7.14%                    71.43%

☐ Select all                                              Accept actions in green

| | 🔒 | Operator action | Expansion of occurrence | Attendance percentage ↓ |
|---|---|---|---|---|
| ☑ | 🔒 | TIC4100015FV\|Value | 1.02 | 71.43% |
| ☑ | 🔒 | TIC4100016FV\|Value | 1.02 | 57.14% |
| ☑ | 🔒 | PI4100205A\|ACK | 38.30 | 28.57% |
| ☑ | 🔒 | XV4100123\|InteractionPar.ManCmd1 | 7.57 | 21.43% |
| ☑ | 🔒 | FIC4100038\|InteractionPar.FacePlate.OutManValue | 3.61 | 14.29% |
| ☑ | 🔒 | XV4100119\|InteractionPar.ManCmd1 | 2.20 | 14.29% |
| ☑ | 🔒 | TIC4100040A\|PIDMode | 20.46 | 7.14% |
| ☑ | 🔒 | MV4100103A\|BPIlock1 | 20.46 | 7.14% |
| ☑ | 🔒 | TIC4100031A\|PIDMode | 20.46 | 7.14% |
| ☑ | 🔒 | XV4100136A\|InteractionPar.ManCmd0 | 20.46 | 7.14% |

Alarm analysis PI4100205A
29 occurrences in September 2020

» Operator actions

Expansion of occurrence ⓘ                    Attendance percentage ⓘ
1x ●────────── 39x    1                       7.14% ●────────── 9.65
                                                         71.43%
☐ Select all                                  [Accept actions in green]

| | | Operator action | Expansion of occurrence | Attendance percentage → |
|---|---|---|---|---|
| ☑ | 🔒 | TIC4100015FV\|Value | 1.02 | 71.43% |
| ☑ | 🔒 | TIC4100016FV\|Value | 1.02 | 57.14% |
| ☑ | 🔒 | PI4100205A\|ACK | 38.30 | 28.57% |
| ☑ | 🔒 | XV4100123\|InteractionsPar.ManCmd1 | 7.57 | 21.43% |
| ☐ | 🔒 | FIC4100038\|InteractionPar.Faceplate.OutManValue | 3.61 | 14.29% |
| ☑ | 🔒 | XV4100119\|InteractionPar.ManCmd1 | 2.20 | 14.29% |
| ☐ | 🔒 | TIC4100040A\|PIDMode | 20.46 | 7.14% |
| ☐ | 🔒 | MV4100103A\|BPBlock1 | 20.46 | 7.14% |
| ☑ | 🔒 | TIC4100031A\|PIDMode | 20.46 | 7.14% |
| ☐ | 🔒 | XV4100136A\|InteractionPar.ManCmd0 | 20.46 | 7.14% |

» Operator actions

Expansion of occurrence ⓘ            Attendance percentage ⓘ

1x ●━━━━━━ 39x                       7.14% ●━━━━━━ 71.43%
                   1                                   9.65
                                                      71.43%

☐ Select all                         [Accept actions in green]

| ☐ | | Operator action | | Expansion of occurrence | | Attendance percentage → |
|---|---|---|---|---|---|---|
| ☑ | ⌂ | TIC4100015FV\|Value | | 1.02 | | 71.43% |
| ☑ | ⌂ | TIC4100016FV\|Value | | 1.02 | | 57.14% |
| ☑ | ⌂ | P1410020S A\|ACK | | 38.30 | | 28.57% |
| ☑ | ⌂ | XV4100123\|InteractionsPar.ManCmd1 | | 7.57 | | 21.43% |
| ☐ | ⌂ | FIC4100038\|InteractionPar.Faceplate.OutManValue | | 3.61 | | 14.29% |
| ☑ | ⌂ | XV4100119\|InteractionPar.ManCmd1 | | 2.20 | | 14.29% |
| ☐ | ⌂ | TIC4100040A\|PIDMode | | 20.46 | | 7.14% |
| ☐ | ⌂ | MV4100103A\|BPBlock1 | | 20.46 | | 7.14% |
| ☑ | ⌂ | TIC4100031A\|PIDMode | | 20.46 | | 7.14% |
| ☐ | ⌂ | XV4100136A\|InteractionPar.ManCmd0 | | 20.46 | | 7.14% |

» Operator actions

Expansion of occurrence ⓘ     Attendance percentage ⓘ

1x ●————— 39x     7.14% ●————— 71.43%
       1                9.65

[Accept actions in green]

☐ Select all

| | Operator action | Expansion of occurrence | Attendance percentage ↓ |
|---|---|---|---|
| ☑ | TIC4100015F\|Value | 1.02 | 71.43% |
| ☑ | TIC4100016F\|Value | 1.02 | 57.14% |
| ☑ | P14100205A\|ACK | 38.30 | 28.57% |
| ☑ | XV4100123\|InteractionsPar.ManCmd1 | 7.57 | 21.43% |
| ☐ | FIC4100038\|InteractionPar.Faceplate.OutManValue | 3.61 | 14.29% |
| ☑ | XV4100119\|InteractionPar.ManCmd1 | 2.20 | 14.29% |
| ☐ | TIC4100040A\|PIDMode | 20.46 | 7.14% |
| ☐ | MV4100103A\|BPBlock1 | 20.46 | 7.14% |
| ☑ | TIC4100031A\|PIDMode... | 20.46 | 7.14% |
| ☐ | XV4100136A\|InteractionPar.ManCmd0 | 20.46 | 7.14% |

ALARM MANAGEMENT METHODS AND SYSTEMS

APPLICATION FIELD

The present disclosure falls within the field of alarm management technologies that are used for equipment security and for the safety of operators in certain technical areas. More precisely, the present disclosure relates to a technology that allows acting, coordinating, guiding, and, above all, managing technical alarms based on real data.

BACKGROUND OF THE DISCLOSURE

Alarm systems are widely used in technical areas, with the aim of protecting equipment and workers from unwanted incidents, and comprise equipment, preferably electronic, that emits sound or light signaling.

Due to the fact that alarm systems are used in areas composed of a plurality of equipment, it is common for a plurality of alarm triggers to be observed, consequently. Often, the overlapping of alarms makes operators inert, so that these operators fail to observe the necessary measures for that particular signaling.

Furthermore, alarms are commonly used as a basis for operational management of a technical area. This means that the data associated with alarms provides relevant indicators that, in fact, are capable of driving very important technical decisions for that operation, and/or for that particular environment. For this use, it is important that there are ways to extract data from alarms, in a reliable and technical way.

Currently, specific systems and methods are used to perform analyzes and calculate statistics on alarms. However, in none of the available systems or methods is it possible to know the sequence of actions carried out by operators to handle and resolve the alarms in question. Current tools do not allow us to answer how operators respond to an alarm, how response varies, or even whether there is any action actually taken to respond to that type of alarm. This type of answer does not exist or, if necessary, can only be obtained through an interview, but without the precision existing in the data. It is often assumed that response to alarms is as expected.

STATE OF THE ART

To illustrate what is available in the state of the art, some publications in the field of the disclosure are discussed below.

The document "Detection of Frequent Alarm Patterns in Industrial Alarm Floods Using Itemset Mining Methods", published in 2018, describes a data-driven method for finding such groups of alarms, detecting frequent patterns in multiplicity of alarms from historical data of alarms. The contributions of the published study involve: (i) the identification and extraction of alarm multiplicities are formulated; (ii) frequent alarm patterns are defined and itemset mining methods are adapted to discover meaningful patterns in alarm multiplicity; and (iii) new visualization techniques are proposed based on output plots to show alarm multiplicity and alarm patterns.

The document "Data Mining Methods to analyze Alarm Logs in IoT Process Control Systems", published in 2019, discusses a new approach on how to reduce unimportant alarms in a control system and how to show operators the most important alarms using the concepts of Sequence Data Mining and Market Basket Analysis. These approaches help reduce the number of unimportant alarms and highlight alarms that can lead to costly breakdowns or potential accidents.

Finally, the document "Advances in alarm data analysis with a practical application to online alarm flood classification", published in 2019, reviews the state of the art in alarm data analysis and aims to structure the field. A distinction is suggested between sequence mining methods that apply to alarm sequences and time series analysis methods that apply to alarm series. The review highlights that online applications to assist operators during alarm multiplicity episodes have been treated solely as a sequence mining problem in the literature to date. The motivation for a binary series approach is demonstrated through an industrial case study of a gas-oil separation plant, and the performance of the presented method is compared with the performance of an established sequence alignment method.

It is possible to note that the main focus of the publications discussed above is the sequence relationship between alarms, with the main objective of detecting avalanches and alarm cascades. Although the document "Data Mining Methods to analyze Alarm Logs in IoT Process Control Systems" mentions the actions of the operator, the citation only exists to exemplify the possible reasons for the conclusion of an alarm. In none of the three publications are the actions of the operator considered part of the process. Therefore, the methodologies guided by the articles aim to identify the relationship between alarms, identifying groups of alarms that have related activation.

On the other hand, the objectives of the present disclosure include finding the relationships between type of alarm and operator action. The actions of the operator in the industrial plant are, therefore, extremely important. In the present disclosure, unlike the teachings in the publications mentioned above, a method is achieved that allows recognizing a sequence of operator actions that led to the resolution of a specific alarm, that is, the discovery of the alarm response process, in a technical format, which allows for a wide range of possibilities.

It is also worth highlighting that the publications commented above use data mining techniques, which seek to make data associations and discover rules or patterns, focusing on why. The present disclosure employs process mining techniques, which is related to how the data generated in the process explains the process itself. Applied to alarms, process mining makes it possible to discover, monitor and improve alarm processes, whereas data mining would not allow this reach.

Operator actions and alarms have distinct characteristics, both semantically and at the data level. Alarms have a defined start and end, while actions are recorded in a timely manner. And there is no record of the intention of the action of the operator. In other words, to which alarm that action is related, it could even be to no alarm, characterizing it as an action related to the operation. These differences make it impossible to include the analysis of the actions of the operator, simply using them as inputs in the methods of publications available in the state of the art, and impose difficulties even on the application of process mining techniques, justifying the novelty and inventive activity of the method proposed in the present disclosure.

In summary, the present disclosure fills a gap in current alarm management tools by generating, for each type of alarm, a visualization of the response process. The definition of the alarm response process is based on the data recorded by the operating systems, and represents the truth of the data. This is an important advance to the current practice wherein the service process can only be obtained through an interview, or in the operation documents, which represent the ideal or desired, and not necessarily real practice. The present disclosure seeks to represent the real practice of responding to alarms based on operating data. In particular, with the present disclosure it is possible to select and filter actions for each type of alarm. In this way, the disclosure solves a technical problem as it: allows the user to relate the activities of the operator to alarms; allows to apply process mining to generate the alarm resolution flow; it also enables the rationalization of alarms, identifying the alarms that require the most and alarms wherein operators do not take mitigation measures; all of this contributing to a better understanding of alarms and greater effectiveness of alarm systems.

BRIEF DESCRIPTION OF THE DISCLOSURE

The present disclosure relates to an alarm management method capable of mapping an alarm response process with real data in a determined technical area, wherein said method comprises the steps of: Step A: Obtaining Original Record; Step B: Pre-Processing Application on Original Record; Step C: Case Grouping; Step D: Application of Descriptive Statistics; Step E: Application of Present Percentage and Application of Expansion of Occurrence; Step F: Construction of Activity Table, and Step G: Mining.

Preferably, in step A an Original Log record (C1) is provided comprising the record of all alarms and actions as they occurred in that particular technical area. The Original Log (C1) relates only to the alarms for which the user has selected for interest. Furthermore, the user determines, in addition to the alarm of interest, the time to be analyzed, and which actions are of interest.

In step B, pre-processing is applied to the Original Log from step A, in order to remove duplicate lines and alarms and events of no interest, resulting in a Processed Log record (C2). In particular, the Processed Log is the basis for forming cases, where the beginning of a case is marked by the Processed Log line that represents the activation of an alarm of a type, and the end of a case is marked by the Processed Log line which represents, for the alarm of the same type, the first deactivation after activation. The actions taken by an operator between alarm activation and deactivation are included in cases as events, in each alarm activation present in the Processed Log. Additionally, when two or more alarms are triggered simultaneously, a user action is added to the cases related to all alarms activated at that time, and all actions are grouped by alarm occurrence, generating cases (C3).

In step C, the cases determined from the Processed Log are grouped, said grouping occurring by the type of alarm that gave rise to the case.

In step D, descriptive statistics (C5) are calculated for each group determined in step C, wherein said descriptive statistics (C5) comprise: the duration of each alarm, measured by the difference between the moment of activation and deactivation; the occurrence of each alarm, measured by the number of times the alarm is activated and deactivated in the Processed Log; the entropy of the alarm measured by the entropy of the distribution of the time of day that the alarm is activated; the actions during the alarm period measured by the number of actions in the Processed Log between the activation and deactivation of an alarm of the same type; the frequency of each action measured by the number of times each action occurs during the period that the alarm is active. Once the descriptive statistics by alarm type are obtained, these statistics are stored in an alarm list (C4).

In particular, in step E and on the alarm list (C4), an expansion of occurrence (C6) and the percentage of presence (C7) are applied.

In step F, an activity table (C8) is constructed for each type of alarm, wherein each activity represents an action, and its frequency values, percentage of presence and expansion of occurrence are stored in said table. Based on the activity table (C8), the method technically offers suggestions for parameters to be considered by the user, based on the reality identified in the alarm attention procedures, using commercially available process mining tools.

Thus, in step G a process is exposed to the user in the form of a flowchart, which reflects real data of the actions of the user in relation to one or a plurality of alarms.

DETAILED DESCRIPTION OF THE DISCLOSURE

The present disclosure relates to an alarm management method, which allows mapping the actual process of responding to alarms in a determined technical area, wherein said mapping contributes to better effectiveness of alarm systems, avoiding stoppages or even process accidents.

To achieve the objectives of the present disclosure, the method described herein comprises, at least, the steps of:
  Step A: Obtaining Original Record;
  Step B: Pre-Processing Application on Original Record;
  Step C: Grouping of Cases;
  Step D: Application of Descriptive Statistics;
  Step E: Application of Present Percentage and Application of Expansion of Occurrence;
  Step F: Construction of Activity Table with Mining Application; and
  Step G: Provision of Recognized Technical Data.

The operation of the disclosure begins with a record, here called the Original Log (C1), which comprises the record of all alarms and actions as they occurred in that particular technical area. In practice, at this step the method of the disclosure receives all historical data obtained from the technical area, forming STEP A, and this occurs through the selection of the user when indicating which alarms they wish to recognize. Once presented with the aforementioned historical data, a person skilled in the art determines the period of this history, that is, the time to be analyzed, and which actions and alarms will be part of the filtering.

Then, in STEP B, pre-processing is applied to the Original Log from STEP A, wherein said pre-processing removes duplicate lines and also alarms and events that will not be considered in the analysis, i.e., those outside the selections of the technician. As a result, preprocessing generates the Processed Log (C2).

Cases are formed from the processed log, so that the beginning of a case is marked by the line in the Processed Log that represents the activation of an alarm of a type. Meanwhile, the end of a case is marked by the Processed Log line that represents, for the alarm of the same type, the first deactivation after activation. Additionally, all operator actions between alarm activation and deactivation are included in the case as events. This procedure is applied for each alarm activation present in the Processed Log. During this step, two or more alarms may be activated at the same time and, in this case, when an action occurs, it will be added to the cases related to all alarms activated at that time. At the end of this step, the result comprises the actions grouped by alarm occurrence, generating cases (C3).

In STEP C, the cases determined from the Processed Log are grouped, said grouping occurring by the type of alarm that gave rise to the case.

Subsequently, in STEP D, for each group, based on the events present in the cases, descriptive statistics (C5) are calculated. Precisely, the descriptive statistics of each alarm preferably comprise the following data: the duration of each alarm, measured by the difference between the moment of activation and deactivation; the occurrence of each alarm, measured by the number of times the alarm is activated and deactivated in the Processed Log; the entropy of the alarm measured by the entropy of the distribution of the time of day that the alarm is activated; the actions during the alarm period measured by the number of actions in the Processed Log between the activation and deactivation of an alarm of the same type; the frequency of each action measured by the number of times each action occurs during the period that the alarm is active.

Once the descriptive statistics by type of alarm are obtained, these statistics are stored in an alarm list (C4), and subjected to an expansion of occurrence procedure, through which the next step is formed.

In STEP E, based on the descriptive statistics stored in STEP D, which form the composite alarm list (C4), an increase in occurrence (C6) and percentage of presence (C7) are applied.

In particular, the expansion of occurrence (C6) comprises a particular type of statistics of an action in relation to an alarm. Its data source is the frequency of actions within alarms and duration of alarms. Its function is to measure the relationship between the event happening together with an alarm, or not. Its formula is given by:

$$Ao = [Oi/Ti]/[Of/Tf] \qquad \text{[Formula 1]}$$

where:
Ao is the expansion of occurrence;
Oi corresponds to the occurrences of the action while the alarm was activated;
Ti is the time the alarm was activated;

Of corresponds to the occurrences of the action while the alarm was deactivated; and
Tf is the time that the alarm was deactivated.

In its turn, the presence percentage (C7) is a second particular type of statistics of an action in relation to an alarm. Its data source is the frequency of alarms and actions. Its function is to measure the proportion of times that the event occurs while the alarm is activated. Its formula is given by:

$$Pp = Ac/At \qquad \text{[Formula 2]}$$

where:
Pp is the percentage of presence;
Ac is the number of periods that the alarm was activated and the action occurred during the period, and
At is the total number of alarm activation periods.

Figure 1:
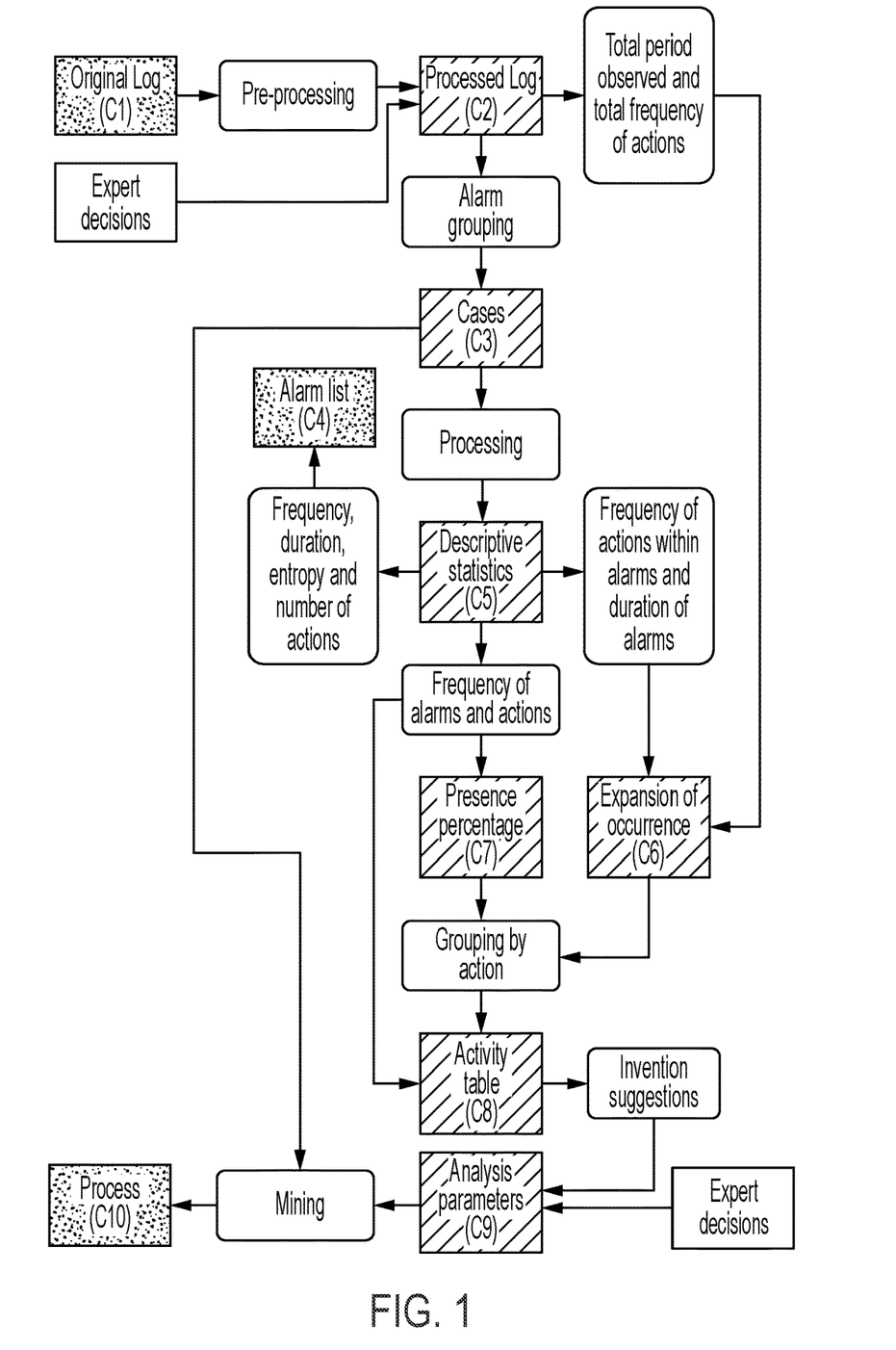
FIG. 1 is a representative flowchart of the method of the present disclosure.
Figure 2:
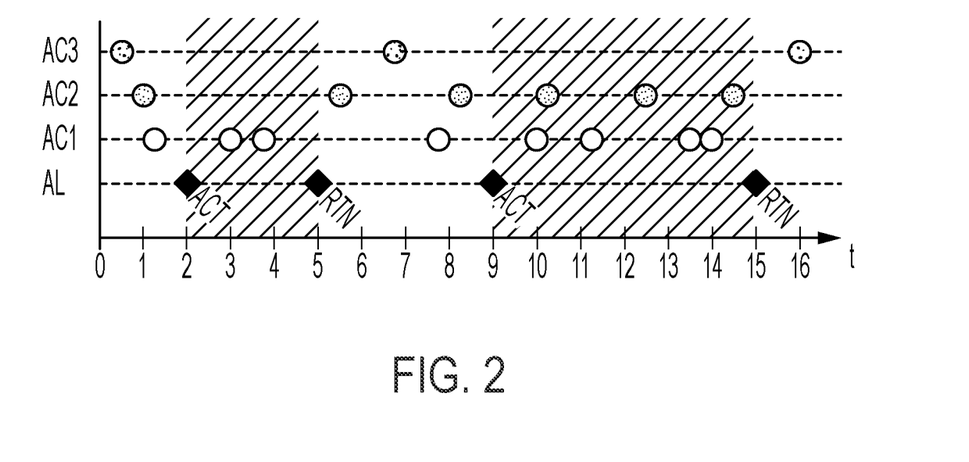
FIG. 2 is a graphical representation of the events of an alarm log.

To see it more clearly, in FIG. 2 it is possible to observe a graphical representation of the events of an alarm log (AL) and the actions (AC1), (AC2) and (AC3), over time (t). The periods between alarm activation (ACT) and return to normal (RTN) are the periods wherein the alarm was activated (represented by the hatched area). The circles in the graphs represent an occurrence of a certain action. Looking at the graph, it is possible to see that the actions AC1, AC2 and AC3 have different characteristics. A1 occurs much more during alarm activation. AC2 occurs both during alarm activation and outside. And AC3 only occurs outside the alarm activation period. Using the values of the increase in occurrence and percentage of presence, it is possible to capture these characteristics, as demonstrated below.

To expand the occurrence:
The total activated alarm time is (5–2)+(15–9). In other words, Ti=9. The total time that the alarm was deactivated is the total log time minus the alarm activated time. That is, Tf=16–9=7.
Action AC1 occurred a total of 8 times, 6 while the alarm was activated and 2 while it was not. In other words, Oi=6 and Of=2. Applying the formula, the magnification of occurrence of AC1 is Ao=[6/9]/[2/7]=2.33. Doing the same for actions AC2 and AC3 results in an increase in occurrence for all actions in relation to the AL alarm: AC1=2.33; AC2=0.77; AC3=0.

For attendance percentage:
Of the two times that the AL alarm activated, only once had AC2 present. That is, Ac=1, At=2.
Applying the formula, the percentage of AC2 presence is Pp=[1/2]=0.5. Doing the same for actions AC1 and AC3 obtains the percentage of presence for all actions in relation to the AL alarm: AC1=1; AC2=0.5; AC3=0.

Figure 3A:
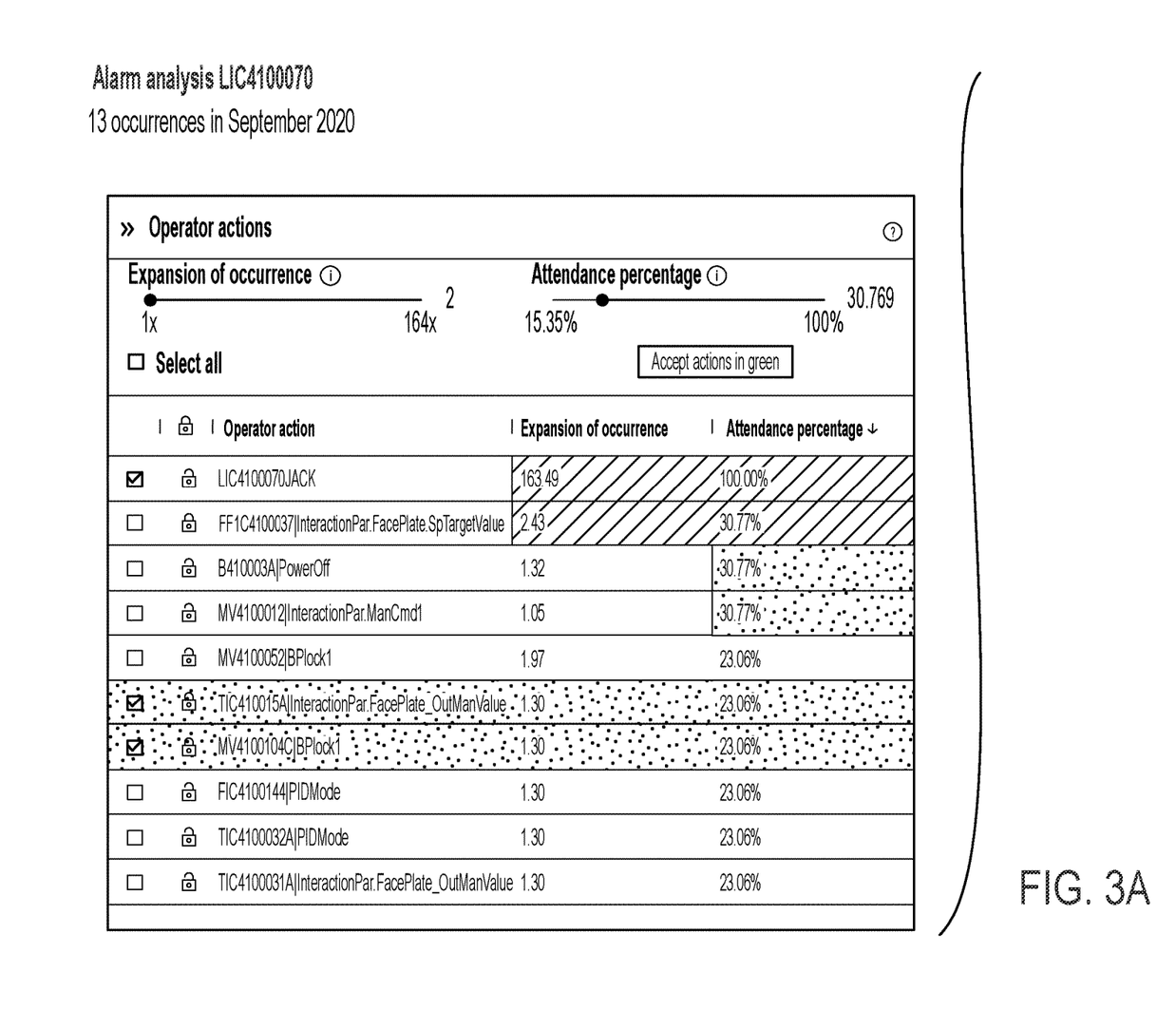
FIGS. 3A and 3B are exemplary illustrations of an activity table with options for defining analysis parameters using checkboxes and padlocks.
Figure 3B:
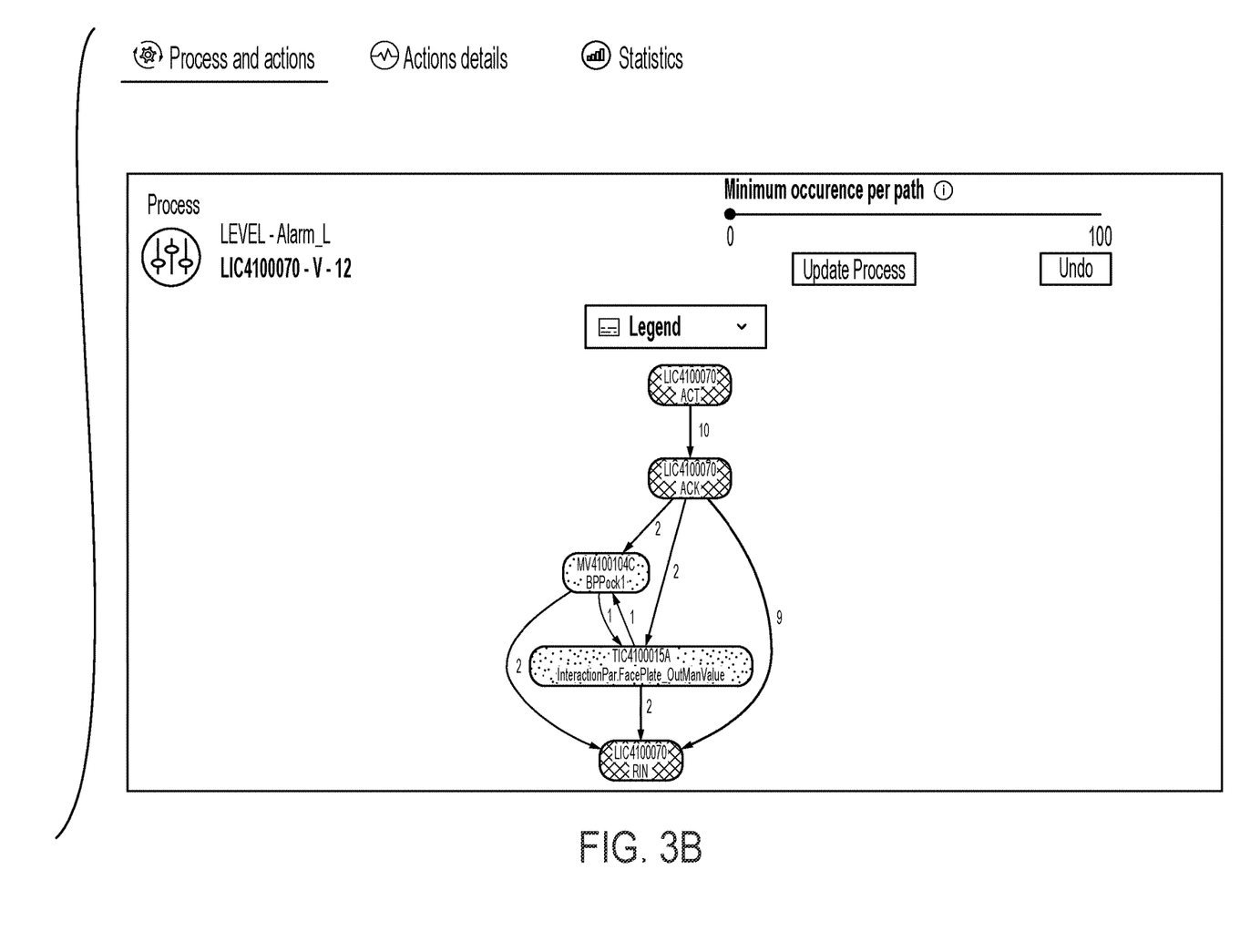

For each type of alarm, an activity table (C8) is constructed. FIGS. 3A and 3B illustrate a format for this activity table. The construction of this table determines STEP F. Each activity represents an action, and its frequency values, percentage of presence and increase in occurrence are stored in the table.

Based on the activity table and decisions made by the technical user, analysis parameters (C9) are constructed. Still referring to FIGS. 3A and 3B, these figures represent how the disclosure allows defining the parameters of activities. Each activity has an inclusion parameter, represented by checkboxes, which will define whether the corresponding action will be included in the analysis or not. When starting an analysis, the method of the present disclosure is capable of suggesting parameters, that is, which activities should be included in the analysis or not. This suggestion is based on the values in the activity table, the inclusion criteria for value were previously defined through experiments. In FIGS. 3A and 3B, the suggested activities are those with their values hatched. Furthermore, the disclosure allows the user to change parameters as deemed necessary, including or removing activities. This resource allows the specialist to use his knowledge to refine the analysis, maintaining the technical requirements defined by the intelligence of the disclosure. Depending on the alarm, the amount of activity may be very high. To facilitate the selection of activities, the present disclosure allows the activity table to be automatically filtered, marking the activity checkboxes according to their presence percentage increase values above levels defined by the user, changing the initial suggestion of the disclosure. The padlock option, next to the checkbox, allows the user to make an activity fixed. Activities do not have their checkbox automatically changed by the system, allowing the user to force their decision whether to include an activity in the analysis. As an example, still in FIG. 8, the first two activities were suggested by the disclosure. But the user decided to exclude the second one from the analysis (checkbox unchecked) and force the disclosure not to include it again (padlock checked). Finally, process (C10) is mined.

Therefore, STEP G comprises the mining application. Internally, mining is done by creating a new log and mining over it. This log is created from the list of cases, including only the activities defined in the analysis parameters, in STEP E. This log can then be mined by any available process mining algorithm. For example, the "sequence miner" meets the preferred demand of the disclosure.

Finally, ending with STEP G, the method of the disclosure is completed by exposing a process presented to the user in the form of a flowchart.

Example Embodiment of the Disclosure

Below is an example of implementation that illustrates how the disclosure contributes to the technical problem reported above, that is, the actual recognition of the alarm response procedure/process from the system event history, for a better effectiveness of alarm systems.

Figure 4:
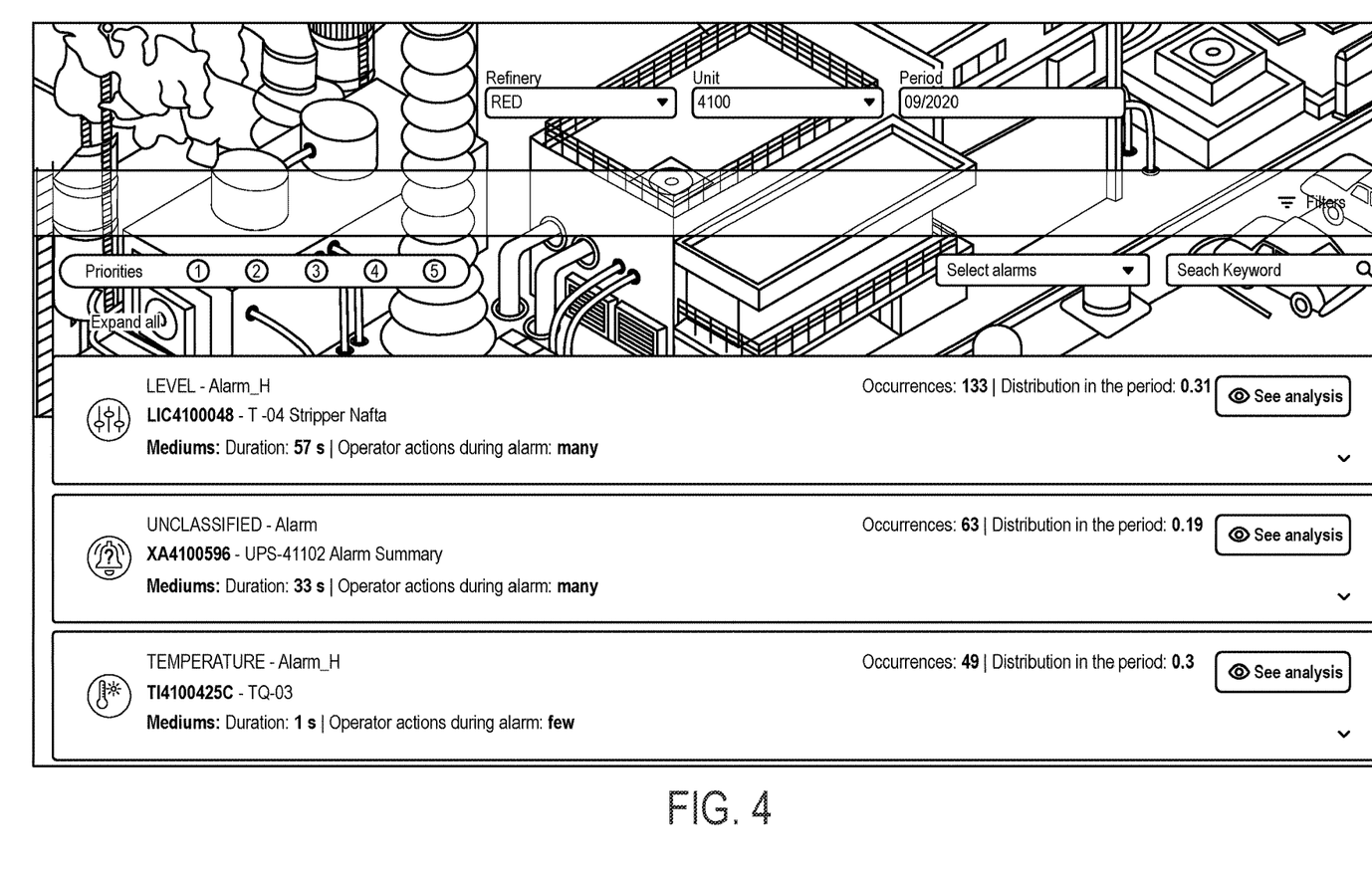
FIG. 4 is an illustrative screenshot of the alarm selection interface for recognition by the user.

In FIG. 4, we have an example of the beginning of implementation of the method of the disclosure, where can be seen an alarm selection screen for inspection, referring to STEP A. The objective of this screen is to highlight, according to the criteria of the user, which alarms are most relevant for inspection. To assist the user in selecting the relevant alarms for recognition, the method of the disclosure has indicators and filters for each of the alarms. First, the user selects the universe of alarms to be analyzed by choosing, for example, in an oil and gas industry environment, the refinery, the unit and the period of time. The user has other filters to select alarms for analysis, namely: median alarm duration, median number of operator actions within the alarm activation period, number of alarm occurrences, alarm type and alarm priority, in addition to the index that indicates the distribution of the alarm in the period (this index is based on entropy, defined in Information Theory). For numeric values, the user is allowed to filter by ranges. For categorical values, the filter allows the user to select which categories should be displayed in the alarm list, presented to the user for detailed management.

Figure 5:
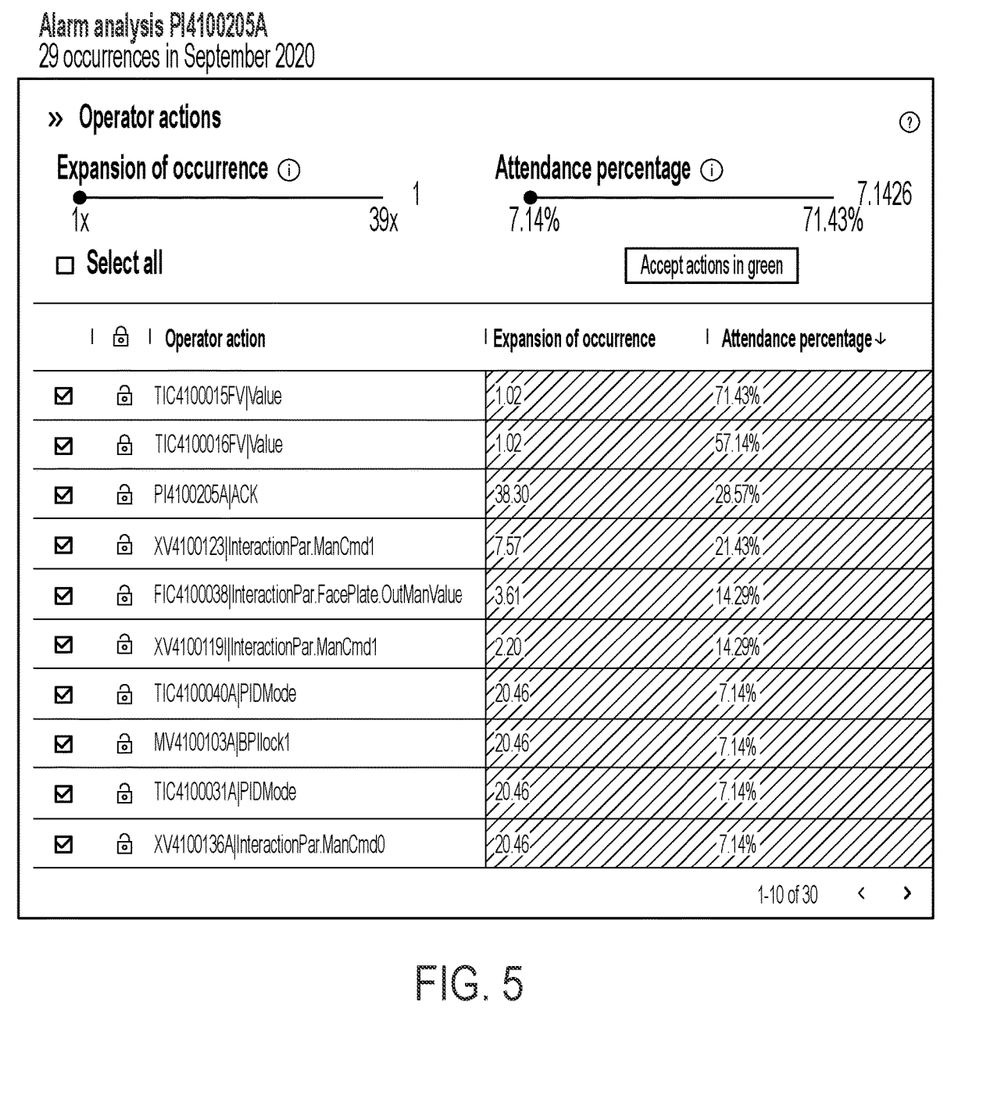
FIG. 5 is an exemplary screenshot of alarm selection for management using the method of the disclosure.
Figure 6:
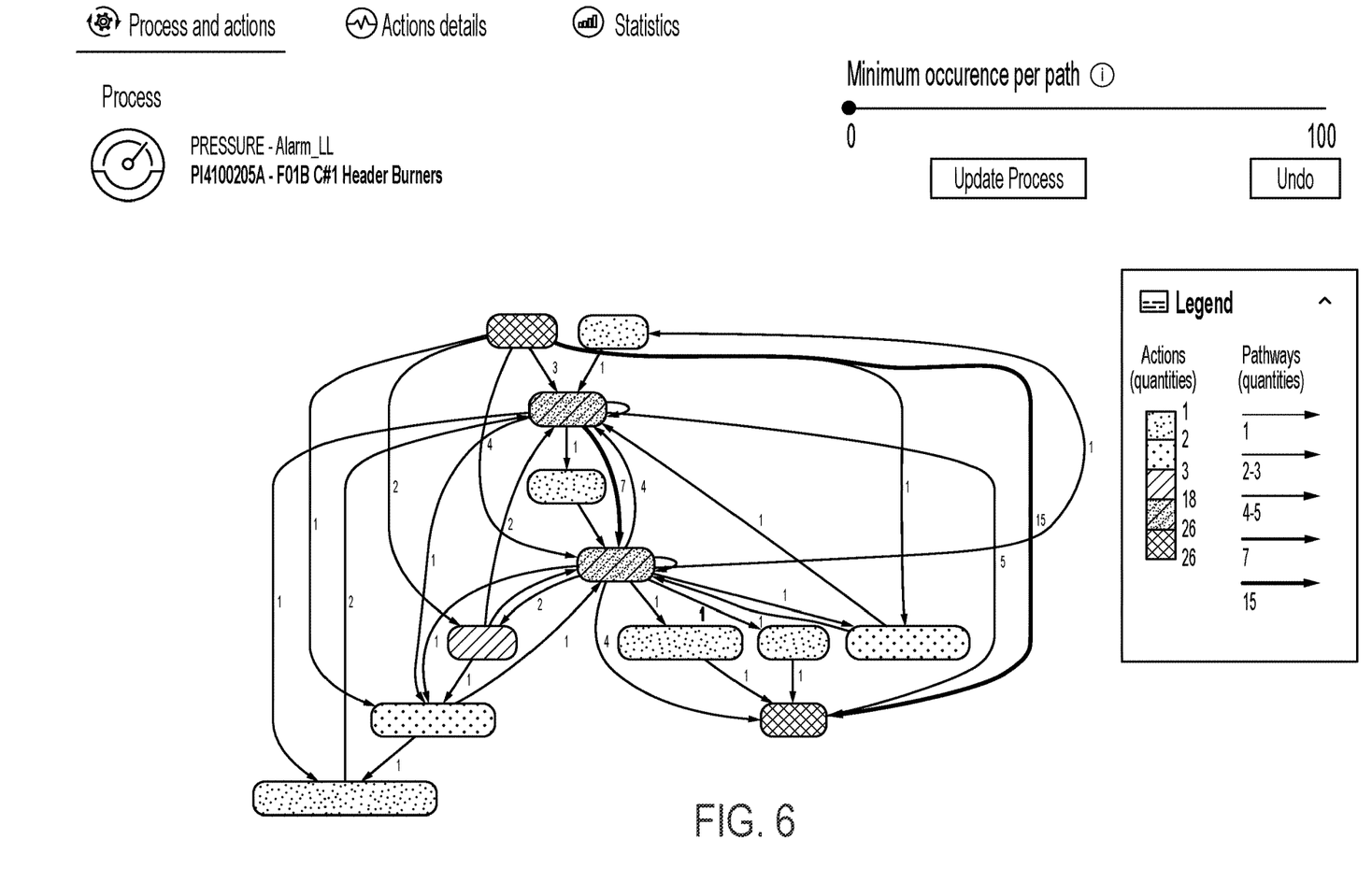
FIG. 6 is an illustrative screenshot of the interface exposing a mined process or procedure.

Selecting one of the alarms from the list allows a detailed analysis of the alarm, which is made up of the selection of actions and the mined process, as exemplified in FIGS. 5 and 6 for the example alarm, identified as PI4100205A.

FIG. 5 shows how the analyst selects the actions relevant to the alarm in question. For this purpose, the method provides filtering and manual selection facilities. The user can select limit values for expansion of occurrence and percentage of presence. When the user changes the filter threshold values, the disclosure first highlights, in the list of activities, which values of each activity are being included by the filter. In the specific case of FIG. 5, as the screenshot is limited in space, all actions were selected. Also, through checkboxes, the disclosure allows the user to directly control which activities they wish to include in their recognition. To exemplify the use of the method, in the following figures the selection of actions and the mined process will be exemplified side by side.

Figure 7A:
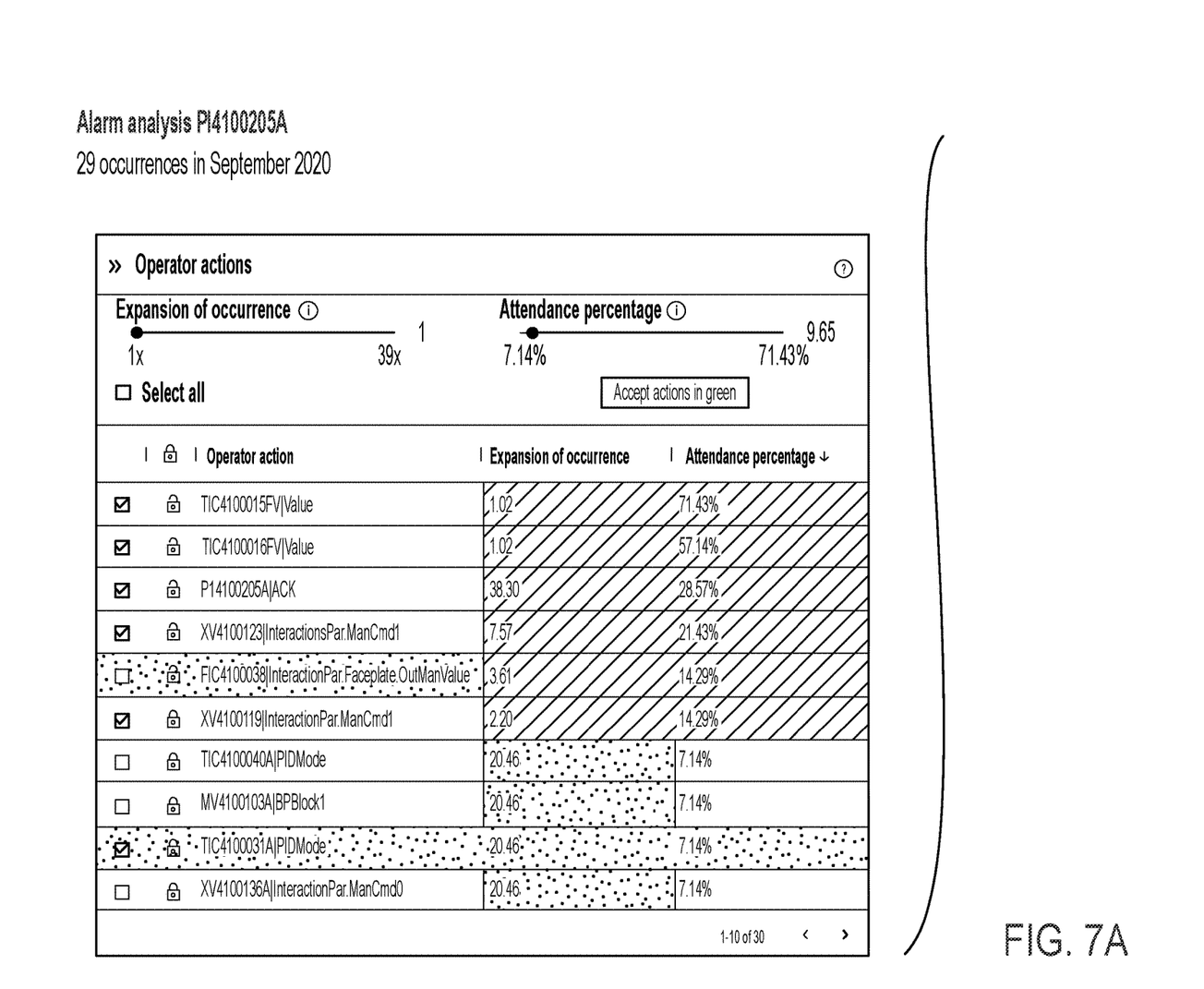
FIGS. 7A and 7B are illustrative screenshots of the interface exposing an alarm process after changes to activity filters by a user.
Figure 7B:
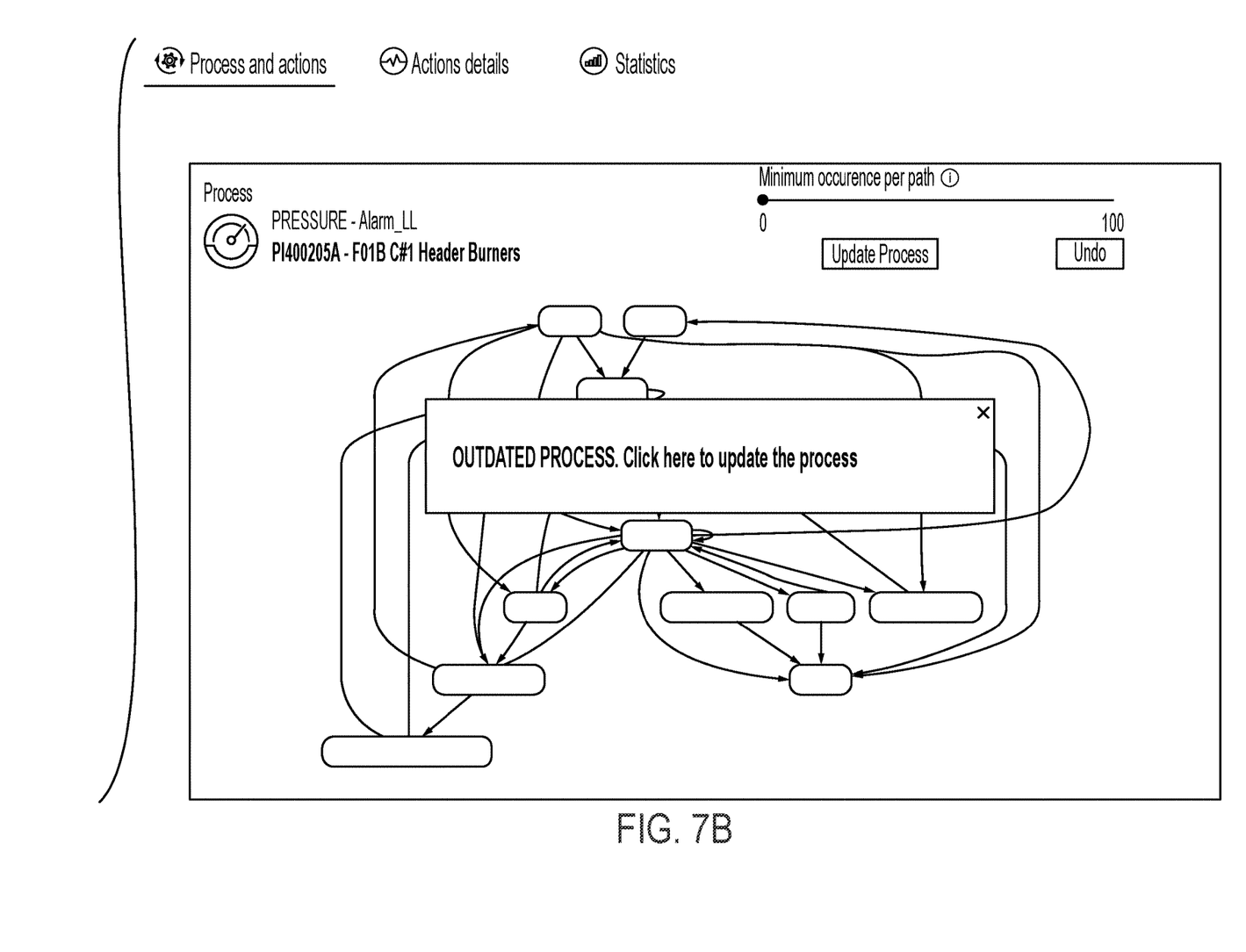

In FIGS. 7A and 7B, the slider values were modified in relation to FIG. 5, in order to filter more actions. Therefore, it is possible to verify that some of the actions are no longer highlighted in the activity table. The disclosure also allows the user to protect activities, as exemplified by the padlock icons next to the name of the activities in FIGS. 5, 7A and 7B, preventing them from being affected by the filter. With this protection function, the disclosure allows the user to mix manual and automated selections according to their judgment.

Figure 8A:
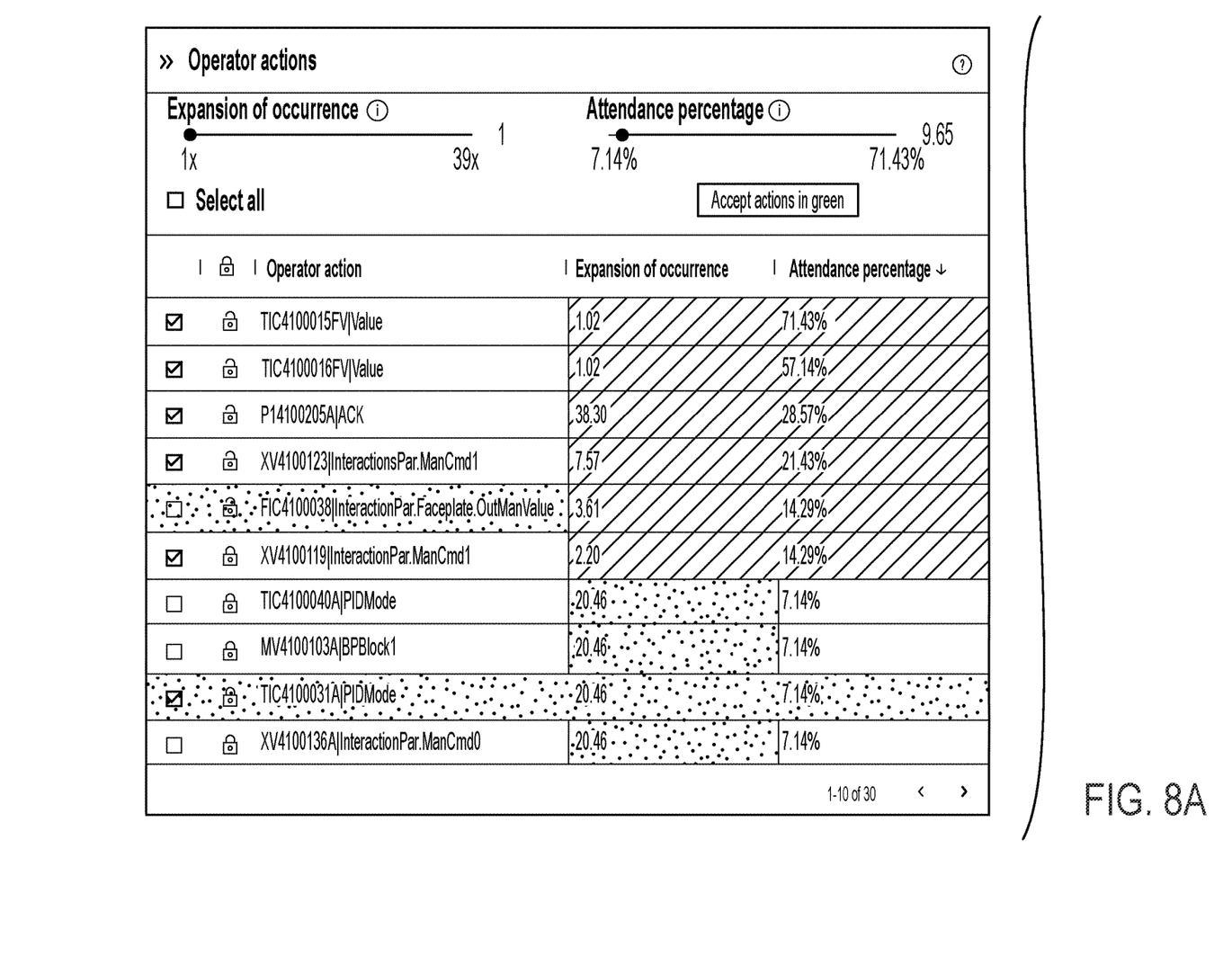
FIGS. 8A and 8B are illustrative screenshots of the interface exposing an alarm process after changes to activity filters by a user, in a second mining.
Figure 8B:
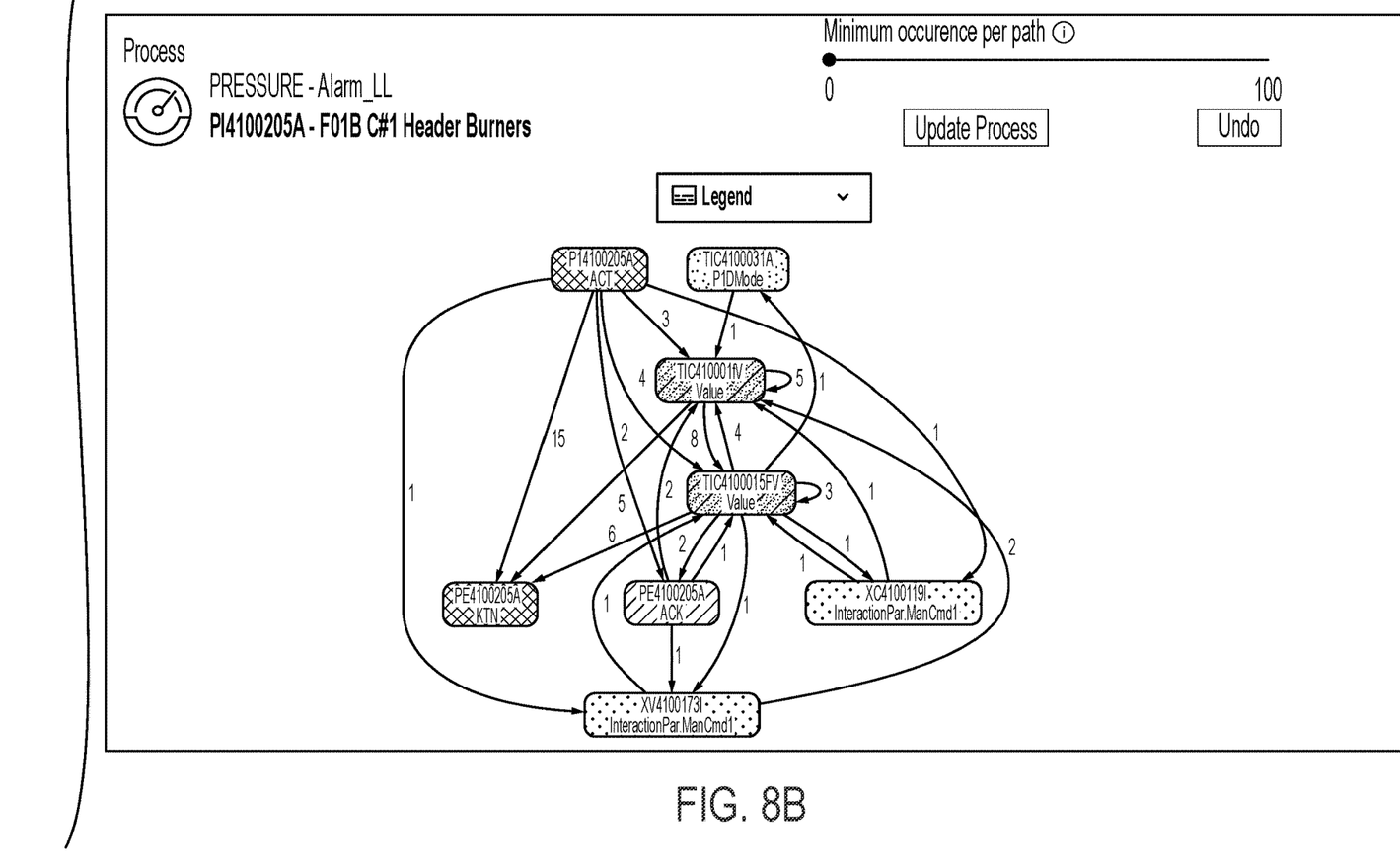
Figure 9A:
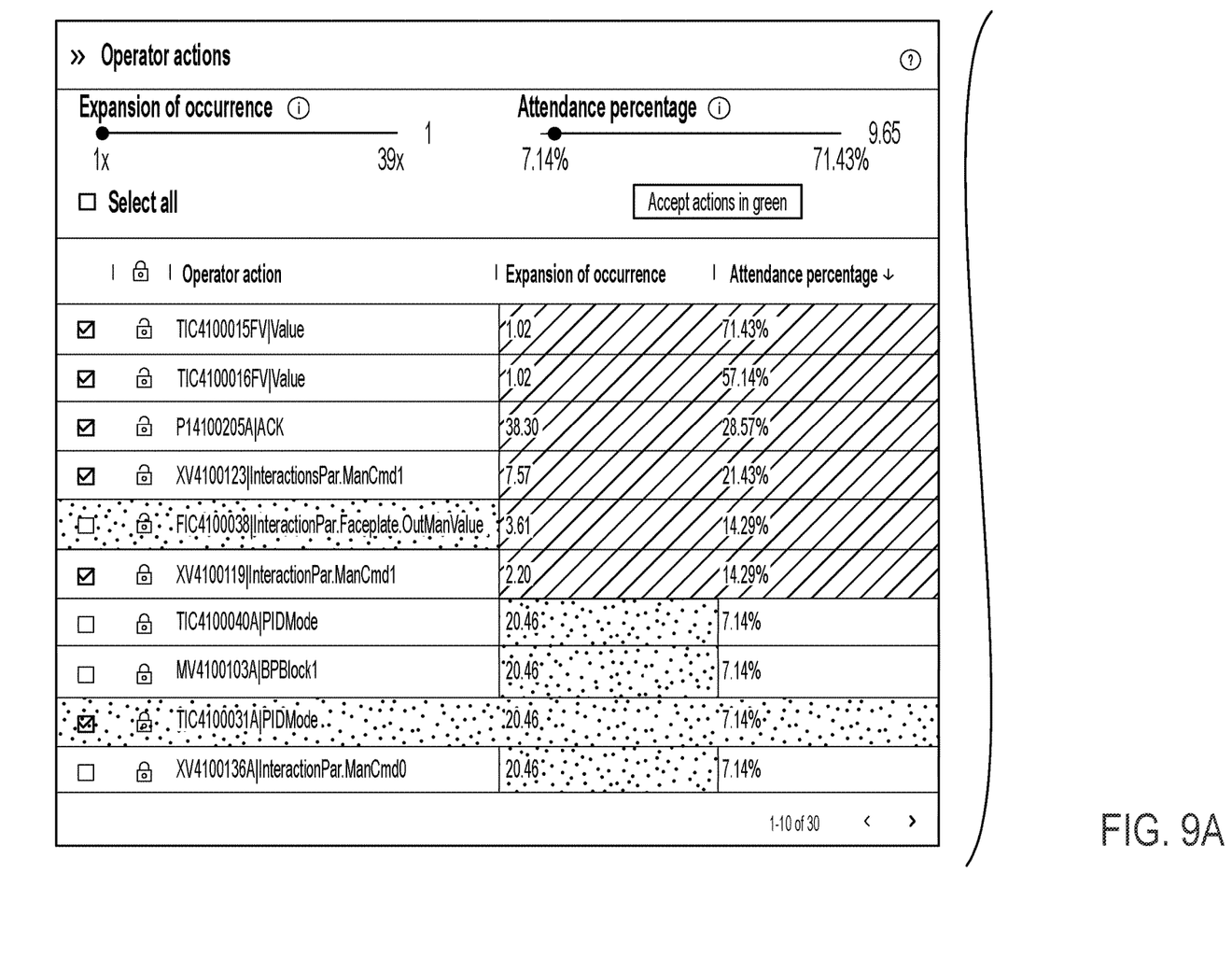
FIGS. 9A and 9B are screenshots of the analysis step of an alarm process, after reducing the number of edges.
Figure 9B:
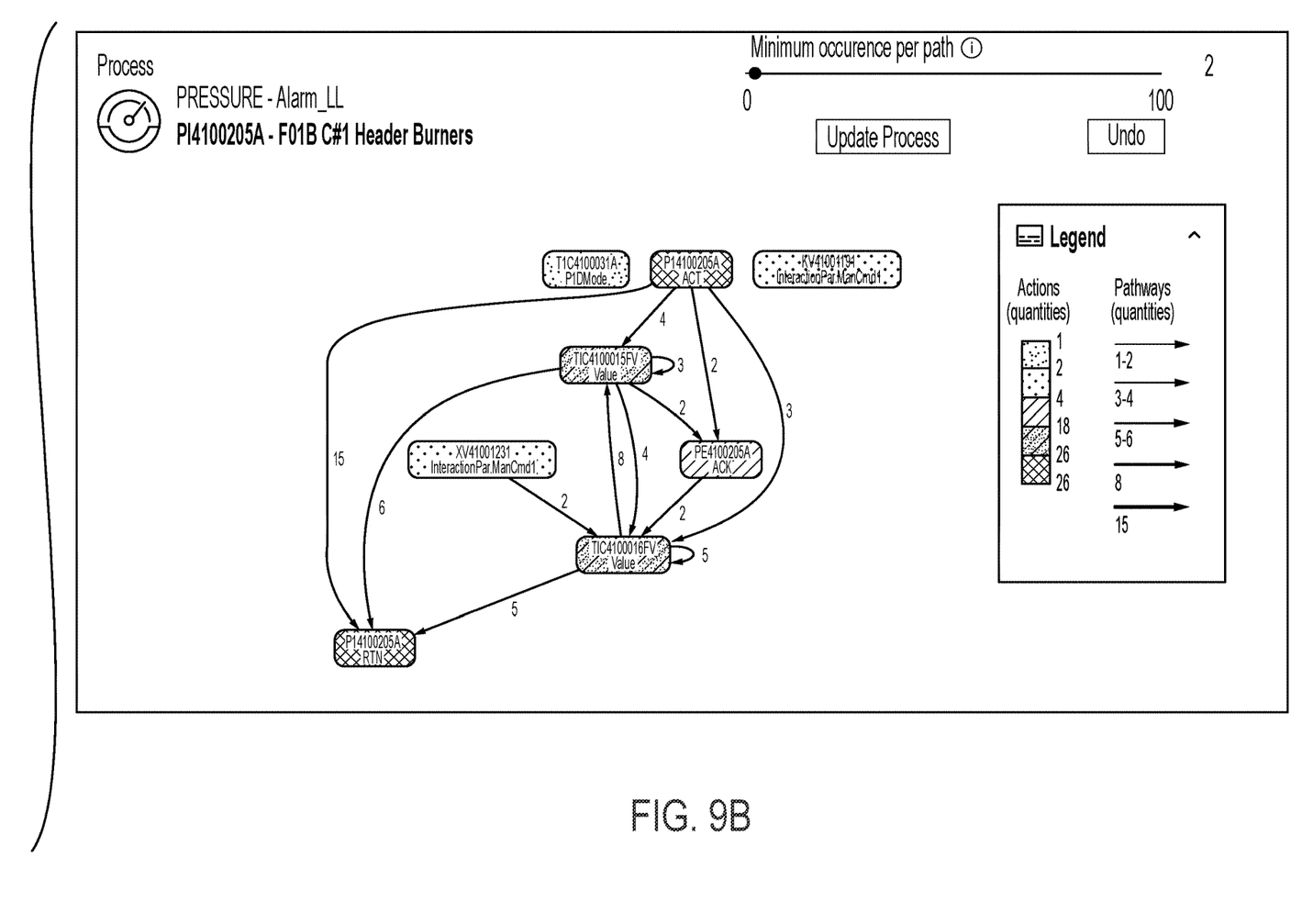

Based on the selected activities and the log provided, that is, Original Log, the disclosure mines the alarm process, as can be seen in FIGS. 8A and 8B. Once updated, the mined process is presented in flowchart format, with a color scale of nodes and edges based on their occurrence or duration values—according to user selection. In addition to the color scale, the disclosure displays, on the edges, the occurrence and duration values.

In addition to the activity filter, the disclosure allows filtering low-occurrence edges. This function can be seen in FIG. 5 in the upper right corner, in the minimum occurrence per path slider. When comparing FIGS. 5 and 4, it is possible to observe the differences between the processes after reducing the minimum occurrence value to display an edge.

The disclosure, therefore, defines an interactive method of filtering actions that, in the end, results in a flowchart that represents the alarm response process under analysis. With this result, the analyst can draw conclusions about whether the desired actions are being carried out correctly, and make decisions about procedural changes, improvements, automation, or training.

The present disclosure is defined here in terms of its preferred embodiment. However, a person skilled in the art is perfectly capable of observing what modifications can be made to the information described here, these modifications still being covered by the same scope of the matter described and claimed.

The invention claimed is:

1. An alarm management method to map an alarm response with real data in a determined technical area, the method comprising the steps of:
   obtaining an original record;
   performing a pre-processing application on the original record;
   grouping of cases;
   performing application of descriptive statistics, the descriptive statistics calculated for each group determined in the grouping of cases, the descriptive statistics comprise: (a) duration of each alarm, measured by difference between moment of activation and deactivation, (b) occurrence of each alarm, measured by the number of times the alarm is activated and deactivated in the processed log, (c) entropy of the alarm measured by entropy of a distribution of time of day that the alarm is activated, (d) actions during an alarm period measured by a number of actions in the processed log between the activation and deactivation of an alarm of the same type, and (e) frequency of each action measured by the number of times each action occurs during the period that the alarm is active, the descriptive statistics obtained by alarm type and stored in an alarm list;

performing application of present percentage and application of expansion of occurrence;

constructing an activity table with mining application; and providing of recognized technical data.

2. The method according to claim 1, wherein the original record comprises an original log record including a record of all occurrences of alarms and actions in a particular technical area, wherein the original log record only is related to alarms for which a user has selected for interest, and wherein the user determines, in addition to alarms of interest, the time to be analyzed, and which actions are of interest.

3. The method according to claim 2, wherein the pre-processing is applied to the original log to remove duplicate lines, alarms, and events of no interest, thereby to result in a processed log record.

4. The method according to claim 3, wherein the processed log is the basis for forming the cases, wherein the beginning of a case is marked by a processed log line that represents the activation of an alarm of a type, and the end of a case is marked by a processed log line that represents, for the alarm of the same type, a first deactivation after activation, wherein actions taken by an operator between alarm activation and deactivation are included in cases as events, in each alarm activation present in the processed log, wherein when two or more alarms are triggered simultaneously, a user action is added to the cases related to all alarms activated at that time, and wherein all actions are grouped by alarm occurrence, thereby to generate cases prior to the grouping of cases.

5. The method according to claim 1, wherein the cases are determined from a processed log and are grouped, and wherein the grouping occurs by type of alarm that gave rise to the case.

6. The method according to claim 1, wherein the descriptive statistics are calculated for each group determined in the grouping of cases, wherein the descriptive statistics comprise: the duration of each alarm, measured by difference between moment of activation and deactivation, wherein occurrence of each alarm, measured by the number of times the alarm is activated and deactivated in the processed log, includes entropy of the alarm measured by entropy of a distribution of time of day that the alarm is activated, wherein actions during an alarm period measured by a number of actions in the processed log between the activation and deactivation of an alarm of the same type, wherein the frequency of each action measured by the number of times each action occurs during the period that the alarm is active, wherein descriptive statistics by alarm type are obtained, and wherein the descriptive statistics are stored in an alarm list.

7. The method according to claim 1, wherein on an alarm list, the expansion of occurrence and the percentage of presence are applied, the expansion of occurrence considers frequency of actions within the alarms and the duration of the alarms, with a function of measuring the relationship between the event happening together with an alarm, or not, related to the expansion of occurrence, the occurrences of the action while the alarm was activated, the time the alarm was activated, the occurrences of the action while the alarm was deactivated, and the time the alarm was deactivated, and wherein the percentage of presence considers the frequency of alarms and actions, with the function of measuring the proportion of times that the event occurs while the alarm is activated related to the percentage of presence, the number of periods that the alarm was activated and the action occurred during the period, and the total number of alarm activation periods.

8. The method according to claim 1, wherein the activity table for the mining application comprises a process mining application and is constructed for each type of alarm, wherein each activity represents an action and its frequency values, wherein percentage of presence and expansion of occurrence are stored in the activity table, and wherein, based on the activity table, suggestions are technically offered for parameters to be considered by a user, based on the reality identified in the alarm attention procedures, by use of commercially available process mining tools.

9. The method according to claim 1, wherein a process is made available to the user in a form of a flowchart, which reflects real data of the actions of a user in relation to one or a plurality of alarms.

10. An alarm management method to map an alarm response with real data in a determined technical area, the method comprising the steps of:

obtaining an original record;

performing a pre-processing application on the original record;

grouping of cases;

performing application of descriptive statistics, the descriptive statistics calculated for each group determined in the grouping of cases, the descriptive statistics comprise: (a) duration of each alarm, measured by difference between moment of activation and deactivation, (b) occurrence of each alarm, measured by the number of times the alarm is activated and deactivated in the processed log, (c) entropy of the alarm measured by entropy of a distribution of time of day that the alarm is activated, (d) actions during an alarm period measured by a number of actions in the processed log between the activation and deactivation of an alarm of the same type, and (e) frequency of each action measured by the number of times each action occurs during the period that the alarm is active, the descriptive statistics obtained by alarm type and stored in an alarm list;

performing application of present percentage and application of expansion of occurrence;

constructing an activity table with mining application; and providing of recognized technical data.

11. The method according to claim 10, wherein the original record comprises an original log record including a record of all occurrences of alarms and actions in a particular technical area, wherein the original log record only is related to alarms for which a user has selected for interest, and wherein the user determines, in addition to alarms of interest, the time to be analyzed, and which actions are of interest.

12. The method according to claim 11, wherein the pre-processing is applied to the original log to remove duplicate lines, alarms, and events of no interest, thereby to result in a processed log record.

13. The method according to claim 12, wherein the processed log is the basis for forming the cases, wherein the beginning of a case is marked by a processed log line that represents the activation of an alarm of a type, and the end of a case is marked by a processed log line that represents, for the alarm of the same type, a first deactivation after activation, wherein actions taken by an operator between alarm activation and deactivation are included in cases as events, in each alarm activation present in the processed log, wherein when two or more alarms are triggered simultaneously, a user action is added to the cases related to all alarms activated at that time, and wherein all actions are grouped by alarm occurrence, thereby generating cases prior to the grouping of cases.

14. The method according to claim 10, wherein the cases are determined from a processed log and are grouped, wherein the grouping occurs by type of alarm that gave rise to the case, wherein the activity table is constructed for each type of alarm, wherein each activity represents an action and its frequency values, wherein percentage of presence and expansion of occurrence are stored in the activity table, and wherein, based on the activity table, suggestions are technically offered for parameters to be considered by a user, based on the reality identified in the alarm attention procedures, by use of commercially available process mining tools.

15. The method according to claim 10, wherein the activity table is constructed for each type of alarm, wherein each activity represents an action and its frequency values, wherein percentage of presence and expansion of occurrence are stored in the activity table, wherein, based on the activity table, suggestions are technically offered for parameters to be considered by a user, based on the reality identified in the alarm attention procedures, by use of commercially available process mining tools, and wherein a process is made available to the user in a form of a flowchart, which reflects real data of the actions of a user in relation to one or a plurality of alarms.

16. An alarm management method to map an alarm response with real data in a determined technical area, the method comprising the steps of:
obtaining an original record;
performing a pre-processing application on the original record;
grouping of cases;
performing application of descriptive statistics;
performing application of present percentage and application of expansion of occurrence on an alarm list, (a) the expansion of occurrence considers the frequency of actions within alarms and duration of the alarms, with a function of measuring the relationship between the event happening together with an alarm, or not, being related to the expansion of occurrence, the occurrences of the action while the alarm was activated, the time the alarm was activated, the occurrences of the action while the alarm was deactivated, and the time the alarm was deactivated, and (b) the percentage of presence considers the frequency of alarms and actions, with the function of measuring the proportion of times that the event occurs while the alarm is activated related to the percentage of presence, the number of periods that the alarm was activated and the action occurred during the period, and the total number of alarm activation periods;
constructing an activity table with mining application; and
providing of recognized technical data.

17. The method according to claim 16, wherein the original record comprises an original log record including a record of all occurrences of alarms and actions in a particular technical area, wherein the original log record only is related to alarms for which a user has selected for interest, and wherein the user determines, in addition to alarms of interest, the time to be analyzed, and which actions are of interest.

18. The method according to claim 17, wherein the pre-processing is applied to the original log to remove duplicate lines, alarms, and events of no interest, thereby to result in a processed log record, wherein the processed log is the basis for forming the cases, wherein the beginning of a case is marked by a processed log line that represents the activation of an alarm of a type, and the end of a case is marked by a processed log line that represents, for the alarm of the same type, a first deactivation after activation, wherein actions taken by an operator between alarm activation and deactivation are included in cases as events, in each alarm activation present in the processed log, wherein when two or more alarms are triggered simultaneously, a user action is added to the cases related to all alarms activated at that time, and wherein all actions are grouped by alarm occurrence, thereby to generate cases prior to the grouping of cases.

19. The method according to claim 16, wherein the cases are determined from a processed log and are grouped, wherein the grouping occurs by type of alarm that gave rise to the case, wherein the descriptive statistics are calculated for each group determined in the grouping of cases, and wherein the descriptive statistics comprise: duration of each alarm, measured by difference between moment of activation and deactivation, wherein occurrence of each alarm, measured by a number of times the alarm is activated and deactivated in the processed log, includes entropy of the alarm measured by entropy of a distribution of time of day that the alarm is activated, wherein actions during an alarm period measured by a number of actions in the processed log between the activation and deactivation of an alarm of the same type, wherein frequency of each action measured by the number of times each action occurs during the period that the alarm is active, wherein descriptive statistics by alarm type are obtained, and wherein the descriptive statistics are stored in an alarm list.

20. The method according to claim 16, wherein the activity table is constructed for each type of alarm, wherein each activity represents an action, and its frequency values, wherein percentage of presence and expansion of occurrence are stored in the activity table, wherein, based on the activity table, suggestions are technically offered for parameters to be considered by a user, based on the reality identified in the alarm attention procedures, by use of commercially available process mining tools, and wherein a process is made available to the user in a form of a flowchart, which reflects real data of the actions of a user in relation to one or a plurality of alarms.

* * * * *